United States Patent
Rohs et al.

(10) Patent No.: US 6,213,271 B1
(45) Date of Patent: Apr. 10, 2001

(54) COMPACT DISENGAGING DEVICE FOR CLUTCHES

(75) Inventors: Ulrich Rohs; Hans Rohs, both of Duren; Dietmar Heidingsfeld, Aachen, all of (DE)

(73) Assignee: Rohs-Voigt Patentverwertungs-gesellschaft mbH, Düren (DE)

( * ) Notice: Subject to any disclaimer, the term of this patent is extended or adjusted under 35 U.S.C. 154(b) by 0 days.

(21) Appl. No.: 09/268,114

(22) Filed: Mar. 15, 1999

(30) Foreign Application Priority Data

Mar. 13, 1998 (DE) .................................. 198 10 955
Apr. 22, 1998 (DE) .................................. 198 17 904
Jun. 25, 1998 (DE) .................................. 198 28 198

(51) Int. Cl.$^7$ .................................................. F16D 25/12
(52) U.S. Cl. ............................... 192/85 R; 192/91 R
(58) Field of Search ..................... 192/85 R, 85 C, 192/91 R, 101, 111 A

(56) References Cited

U.S. PATENT DOCUMENTS 811,422 * 1/1906 Menges ........................... 192/101 X
5,009,299 * 4/1991 Seegers ............................ 192/91 R X

FOREIGN PATENT DOCUMENTS

| 1 963 869 | 7/1970 | (DE) . |
| 24 40 039 | 3/1976 | (DE) . |
| 37 06 849 | 9/1988 | (DE) . |
| 38 06 642 | 9/1989 | (DE) . |
| 38 42 722 | 6/1990 | (DE) . |
| 39 30 980 | 3/1991 | (DE) . |
| 40 01 473 | 7/1991 | (DE) . |
| 40 33 624 | 10/1991 | (DE) . |
| 195 25 840 | 11/1996 | (DE) . |
| 197 00 935 | 8/1997 | (DE) . |

* cited by examiner

Primary Examiner—Richard M. Lorence

(57) ABSTRACT

A disengaging device for a clutch with an energy store that releases energy upon disengagement and stores energy upon re-engagement. This device is compactly constructed and allows force to be advantageously reinforced. Mechanisms are used to increase the energy in the energy store in relation to the force arising in the disengaging device. In addition, the invention further comprises mechanisms to divert force, or a roller that is guided via a guide surface and a bevel that interacts with the energy store. Furthermore, a unit of the energy store and a drive are arranged so that they receive forces parallel to each other.

13 Claims, 5 Drawing Sheets

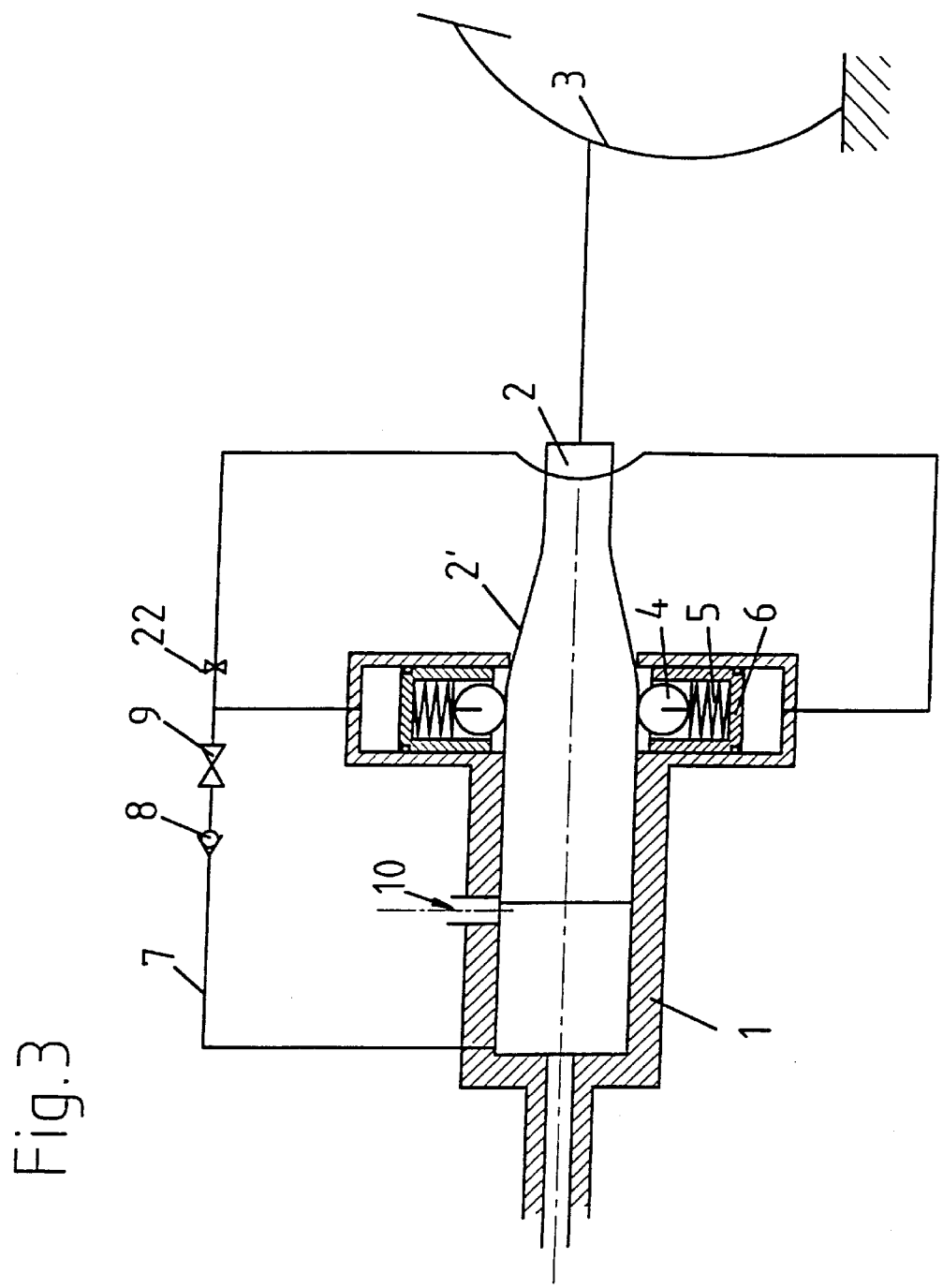

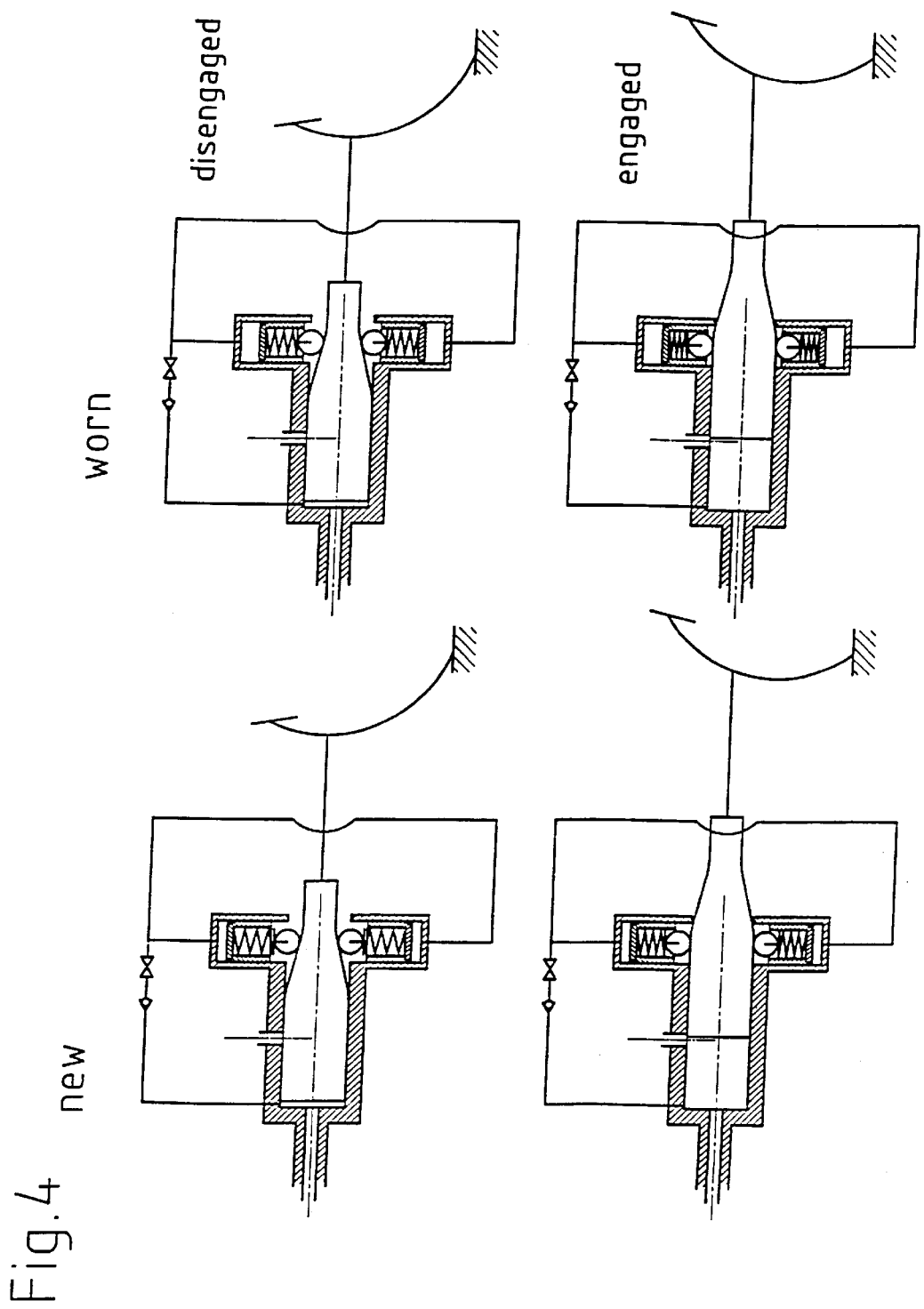

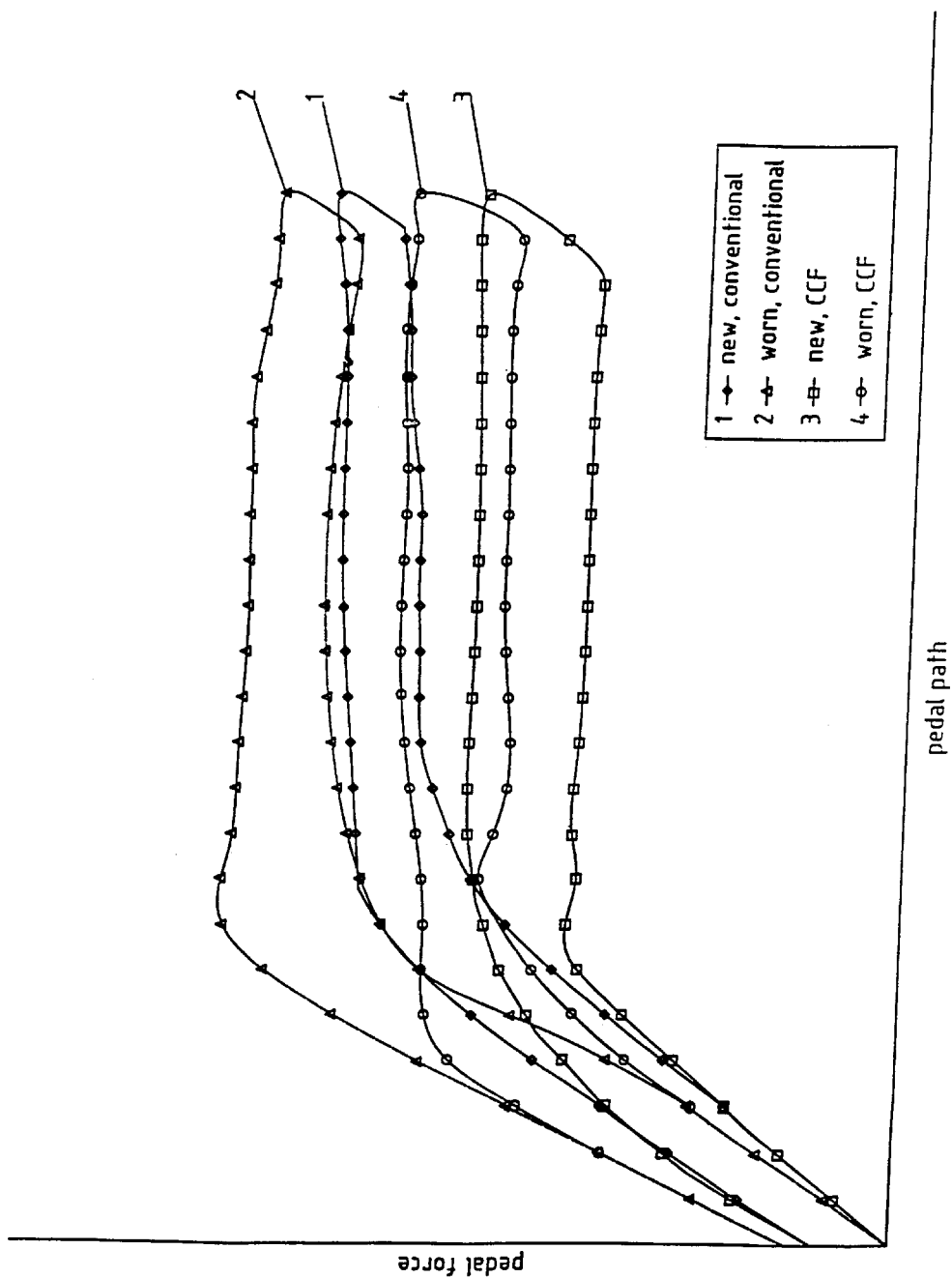

COMPACT DISENGAGING DEVICE FOR CLUTCHES

BACKGROUND OF THE INVENTION

1. Field of the Invention

The invention relates to a disengaging device having an energy store for use in clutches. The energy store can be in the form of a hydraulic system having a check valve.

2. The Prior Art

Disengaging devices are known in the prior art. For example, German Patent DE 38 06 642 AL shows a disengaging device that has an energy store that releases energy upon disengagement and stores energy upon re-engagement. The energy store comprises two springs (perpendicular to a disengaging piston) that interact with the disengaging piston via a rolling bearing serving as a force relay which is guided along an essentially conical path on the disengaging piston. Depending on the wear, the unit with the curved path can be moved along the disengaging piston, whereby clutch wear can be independently taken into consideration. The movement of this unit is proportional to the path of the disengaging piston. The problem with the prior art is that these disengaging devices are not compact and they do not permit optimum force ratios.

SUMMARY OF THE INVENTION

One object of the invention is to offer a disengaging device for a clutch, that is compact and permits optimum force ratios.

Another object of the invention is to provide a disengaging device that is simple in design, inexpensive to manufacture, and easy to install.

The invention provides a disengaging device for a clutch with an energy store. This energy store releases energy upon disengagement to support the work to be done upon disengagement, and stores energy upon re-engagement. This device has a mechanism to increase the energy in the energy store which depends on the force arising in the disengaging device. In addition, in this disengaging device the energy store can be a hydraulic system to store energy.

Such a disengaging device can be constructed in a compact manner since a force injection system such as a hydraulic system can be designed to be space-saving.

The energy increase is proportional to the force arising in the disengaging device. This means that when more force arises, the energy store is also fed more energy. The arrangement is designed so that energy is fed to the energy store when the force arising in the disengaging device exceeds a corresponding value applied by the energy store.

This energy store is designed as a hydraulic system with a check valve. This hydraulic system can inject energy into the energy store via a corresponding piston. While this action occurs, the check valve prevents the energy from returning when the force arising in the disengaging device is reduced.

The disengaging device can be used in conjunction with a clutch that wears down. Therefore, the force required for disengaging rises due to wear and leads to a proportional increase in the operating pressure. The system causes a corresponding energy rise in the energy store in relation to the force arising in the disengaging device. This energy device comes from a mechanism designed to increase the energy in the energy store. Hence the force relief factor from the energy store remains constant over the life of the clutch.

If desired, this factor can be changeable. The release of force can also increase as the clutch wear increases so that the corresponding proportional rise in operating pressure can be countered. Thus, the required force to operate the clutch can remain nearly constant over the life of the clutch. Compensating springs can be used to implement this adjustment. For example, cup springs can be used as the compensation springs that exert greater force when there is less disengagement than when there is more disengagement. If such disc springs directly oppose the force arising in the disengaging device, they act with greater force when the clutch is new and oppose the system pressure with less force when the clutch is worn.

A force-diverting mechanism can be provided between the energy store and the force relay in a disengaging device. In this case, the energy store is coupled to the other disengaging device via a force relay guided along the curved path. The force relay can be a rolling bearing that rolls along the curved path. This allows the energy store to be very small, such as similar to a disengaging piston.

Such force diverting mechanism can be opposing guide curves that apply force in the desired direction to a unit such as a roller.

Of course, the a force-diverting system allows the energy store to be spatially independent of the direction in which the force is applied to the disengaging device.

The disengaging device can be made simply when a component of the energy store and a drive that moves in one direction are arranged so that the two directions that are essentially parallel. Such a compact arrangement allows particularly short paths for the energy increasing mechanism and for a force diversion system which may be necessary. Such short paths allow the unit volume to be small, and the force arising in the disengaging device is transmitted well.

If the force absorbing mechanism is a spring, it can be placed around the drive. This allows a comparatively large spring to be used with a corresponding ability to store energy. This spring can also be used as a disengaging device.

The directions can be defined by any desired coordinates in any desired coordinate system. In particular, these directions can be parallel in cylindrical coordinates or Cartesian coordinates, which means that the directions can be radial, axial or linear.

The cited features of the disengaging device are suitable for a linearly-driven disengaging piston or a similar drive. However, the features can be used for any kind of disengaging device. The term, disengaging device hence concerns any unit that is static or moves simultaneously in a disengaging process. For example, individual units or a group of units that can also participate in the disengaging process.

In a preferred embodiment, the disengaging device is only connected via one force-relaying element such as a hydraulic connection to the disengaging component. The force-relaying element guarantees a certain degree of independence from the disengaging component, such as a pressure plate of a clutch or cup springs and their operating pins that press the pressure plate.

In particular, the disengaging device can be directly connected to a clutch, actuating pedal, or lever. The force-relaying element then creates a corresponding force path from the disengaging device to the disengaging unit such as the clutch itself.

By spatially separating the disengaging device and the disengaging unit such as the clutch, the forces in the disengagement device can be largely independent of the forces arising in the clutch or disengaging unit. The energy store can be used independent of other possibly supplementary mechanism in the clutch to ease the required disengaging work. The disengaging device can be constructed compactly when it comprises at least one roller (guided via a guide surface and a bevel that interacts with the energy store) which interacts with the contour of the drive.

In one advantageous embodiment, the bevel and the contour are basically adjacent, yet run in the opposite direction. This makes it easy to coaxially align the disengaging drive and the energy store. With such an arrangement, the radii of the areas that contact the contour and the areas of the roller the that contact the bevel can be selected so that the roller can roll on both surfaces at approximately the same speed. This ensures a nearly slip-free diversion of force. In particular, when the bevel and the contour change their relative angle during disengaging, the roller can have at least two components that rotate in relation to each other, one of which lies on the bevel and the other on the contour. This allows any arising slip to be transferred to the roller. This slip can be countered with smaller radii and hence less force.

To reduce friction on the guide surface, the roller can have at least one guide body that is rotatably mounted on the roller and guided on the guide surface. This reduces the friction arising at this site.

However, the disengaging device is easier and cheaper to construct when the energy store is a mechanical energy store such as a spring.

In particular, the energy store can be a spring that is axially aligned with a drive of the disengaging device. If the spring is coaxial to the drive, the design of the disengaging device can be particularly compact. In this context, the drive can be a thrusting linkage that is moved with at least one component in its, lengthwise direction.

BRIEF DESCRIPTION OF THE DRAWINGS

Other objects and features of the present invention will become apparent from the following detailed description considered in connection with the accompanying drawings which discloses several embodiments of the present invention. It should be understood, however, that the drawings are designed for the purpose of illustration only and not as a definition of the limits of the invention.

In the drawings, wherein similar reference characters denote similar elements throughout the several views:

FIG. 3 is a schematic representation of a second embodiment in a view similar to that from FIG. 1;

FIG. 4 shows the effect of the disengaging device from FIG. 3 when new and worn; and FIG. 5 is a comparison of pedal force from a conventional disengagement device with pedal force from a disengagement device according to the invention.

DETAILED DESCRIPTION OF PREFERRED EMBODIMENTS

Figure 1:
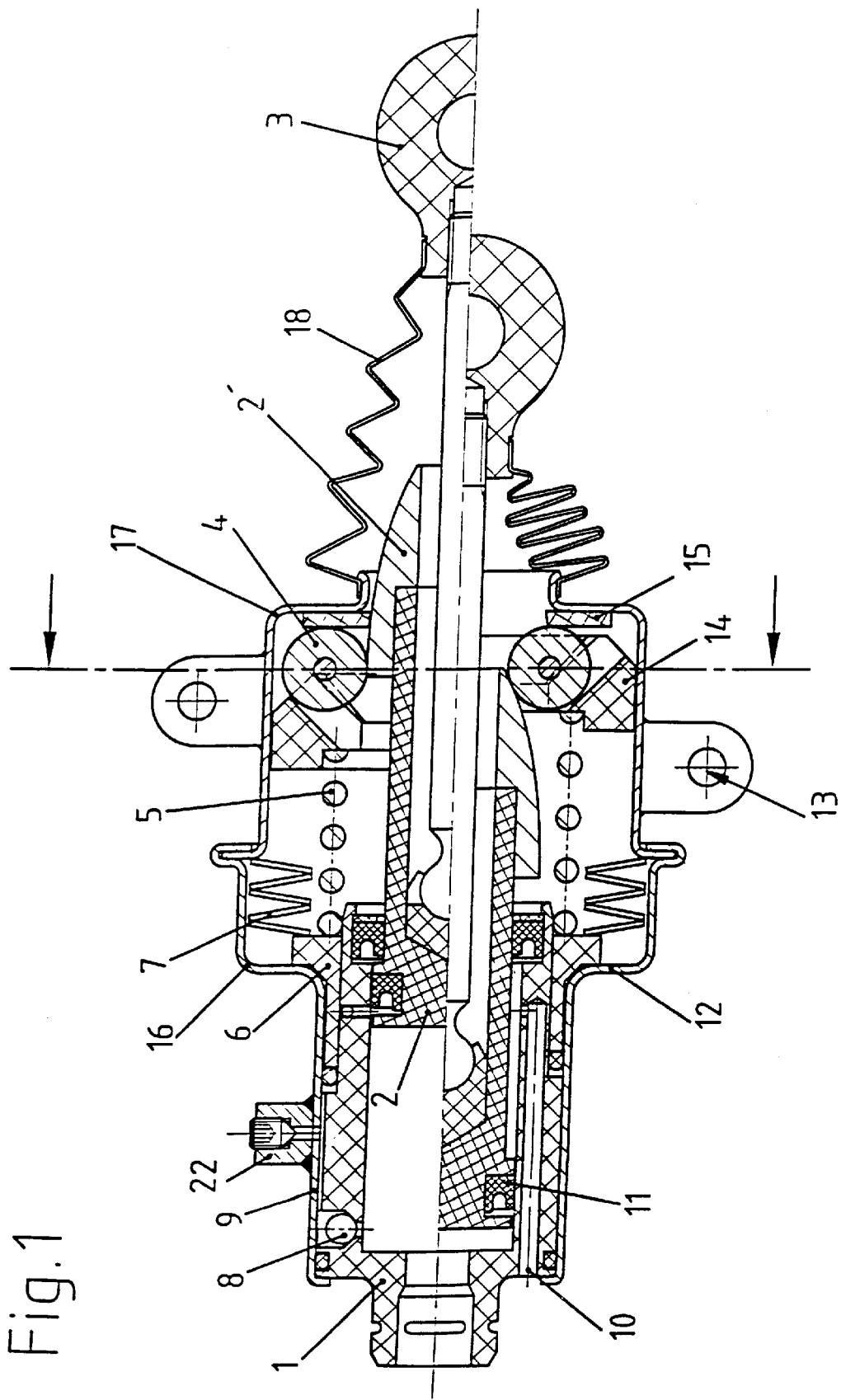
FIG. 1 is a section along line II—II from FIG. 2 of a first disengaging device.

FIG. 1 shows a disengagement device for a clutch. The device comprises a clutch input cylinder 1 of a hydraulic clutch actuating system in which a piston 2 can create disengaging pressure. Piston 2 is actuated by a clutch pedal rod 3 that interacts with a corresponding clutch pedal. Cylinder 1 is sealed with seals 11, 12 and is surrounded by a housing section 16. The disengaging device has another housing section 17 that is connected to housing section 16 by a flanged joint. The housing 16, 17 is closed to form a single unit by a bellows 18 between the housing part 17 and the clutch pedal rod 3.

Piston 2 has a contour 2' at its end facing the pedal. Rollers 4 run on this contour 2' that are pre-tensioned by springs 5. Between springs 5 and rollers 4 that serve as force relays, are mechanisms to divert force. These include a force diverting ring 2.4 with a bevel and a disk 15 with a guide surface. Springs 5, the bevel, and the guide surface, pretension rollers 4, so that they exert an inward radial force on the contour 2'. When the clutch pedal is actuated, rollers 4 move toward clutch pedal rod 3. Force diversion ring 14 is then moved opposite the direction of actuation of the clutch pedal rod 3. In this process, the springs 5 relax and transfer corresponding work to the pistons 2. When the clutch is re-engaged, a cup spring (or the like) of the clutch returns the piston 2 into its initial position, and the spring 5 is re-tensioned.

The design of piston contour 2' can determine the desired reinforcement along the pedal path. As can be seen, the bevel and contour 2' essentially run in opposite directions.

Figure 2:
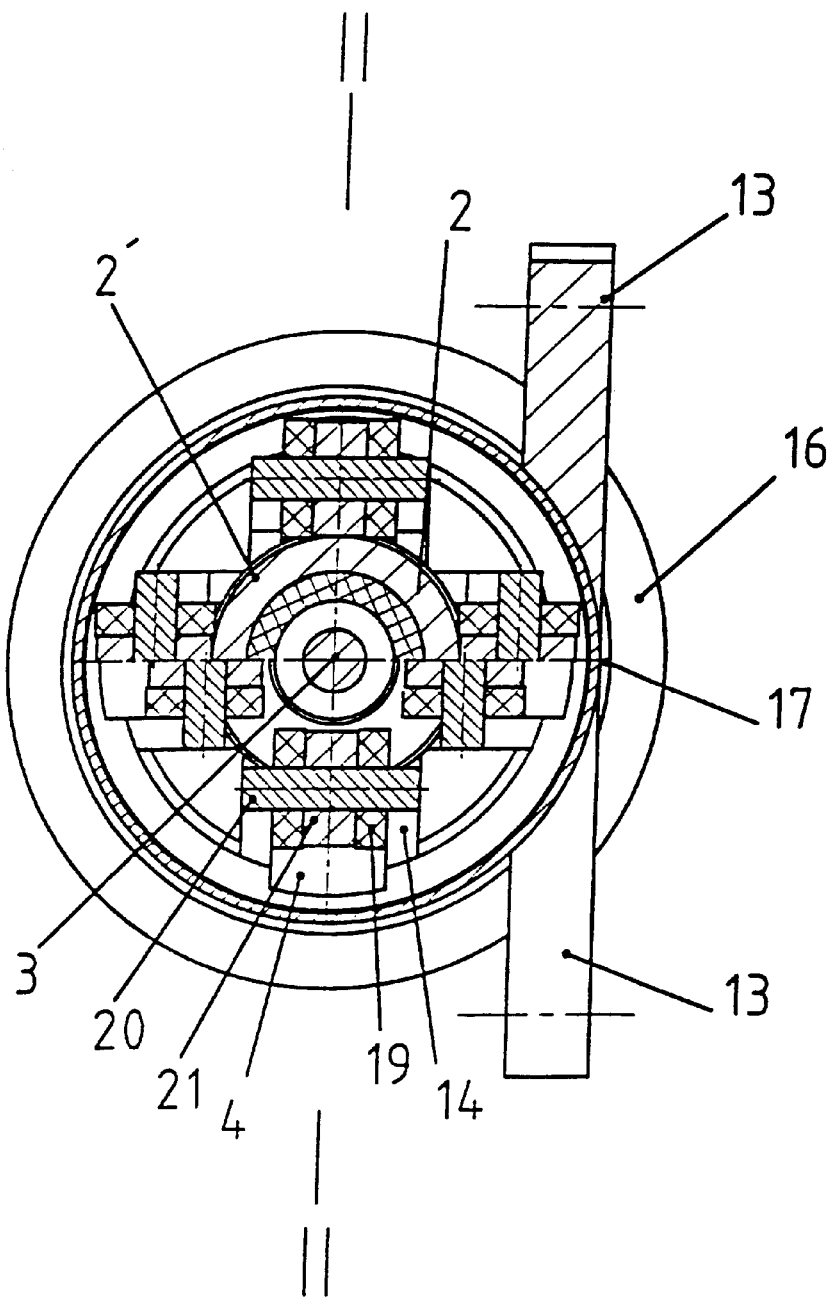
FIG. 2 is a section along line I—I from the disengaging device from FIG. 1.

Rollers 4 comprise roller surfaces 21 that are guided along a shaft 20 as shown in FIG. 2. Roller surfaces 21 contact contour 2' and shafts 20 contact the bevels of the force diversion ring 14. The radii of the rollers 21 and the shafts 20 are selected to have a ratio of 1:42 corresponding to a bevel slope of 45. This ensures nearly slip-free roller surfaces 4 movement even when shafts 20 and rollers 21 are tightly connected. Slippage cannot be completely avoided due to the nonlinear path of the contour 2. Hence to avoid friction loss, the shaft 20 and roller surface 21 are not designed as one piece and can rotate in relation to each other. To avoid unnecessary friction loss at the guide surface of the disc 15, there are two plastic washers 19 on the shaft 20 on both sides of each roller surface 21. The diameter of these plastic washers 19 is slightly larger than the diameter of the roller surfaces 21. Hence plastic washers 19 abut the guide surface of disc 15, while each of roller surfaces 21 are not hindered by disc 15. However, the diameter of the plastic washers is small enough that their rotation is not hindered by contour 2'. Such a design is enabled by the circular cross-section of contour 2' as can be seen in FIG. 2.

To adapt the disengaging device to differences between new and worn clutches, spring 5 abuts a piston 6 that receives system pressure from hydraulic clutch actuation from the cylinder 1. The pressure in cylinder 1 decreases and is fed to the piston 6 via a check valve 8 and a calibrated throttle 9.

When the clutch wears, the required force rises for disengaging which causes a proportional rise in the operating pressure. Since this pressure is applied to the piston 6, the strain on spring 5 rises proportional to the system pressure and the disengaging force. This means that the force relief factor of the clutch pedal remains constant over the life of the clutch. Since only a slight amount of force acts within this system, this factor can be high. One must only ensure that the pedal force never becomes negative taking into account the hysteresis, and that the desired clutch characteristic is retained.

Cup springs 7 that serve as compensation springs and act against the system pressure on the pistons 6 cause the force relief factor to increase as the clutch wear increases. Therefore, the pedal force remains nearly constant over the life of the clutch since the system pressure that rises from wear is counteracted.

Cup springs have the advantage that they can be designed so that more force is exerted with less disengagement than with more disengagement. When the clutch is new, more force opposes the hydraulic pressure, whereas less force opposes the system pressure when the clutch is worn.

The check valve 8 ensures that the pressure exerted on piston 6 and hence the pre-tensioning of spring 5 remains at a maximum. The throttle allows disengagement even when pressure is lost through piston 6 after sitting for a long time. The necessary pressure builds up after using the clutch a few times.

The disengaging device also has a bleed valve 22 that allows the hydraulic system to be depressurized when exchanging the clutch or changing the clutch pads.

Piston 6 covers a blow hole that is connected to bleed valve 10 of the hydraulic system. This ensures that piston 6 cannot be moved beyond the blow hole.

The hydraulics such as the force-relaying element are driven by the cylinder 1 and also allow the disengaging device to be constructed as a separate unit from the clutch. Housing 16, 17 is also provided with clips 13 that serve to affix the disengaging device.

The inner diameter of disc 15 is selected to be narrow so that contour 2' cannot penetrate disc 15. This helps with assembly of the disengagement device.

Of course, corresponding mechanical devices can be used instead of hydraulic mechanisms to increase energy. The embodiment in FIG. 3–5 is not as compact as the previously described one. Basically, however, it is constructed similar to the previously described embodiment. Identical components are numbered the same in both embodiments. The second disengaging device has springs 5 on both sides of piston 2. These are perpendicular to piston 2 in this exemplary embodiment and hence receive a force perpendicular to the drive of the disengaging device. Of course, this preferred direction can be easily changed as desired with the roller guide discussed in the first embodiment. Likewise, the hydraulic lines for the mechanisms to increase energy are inside the housing which makes this disengaging device more compact than prior art disengaging devices.

As can be seen in FIG. 4, the springs 5 are compressed when the clutch is worn by increased system pressure so that more energy is stored in the energy store or springs 5 that can be used to relieve the disengaging work. The resulting improvement in the pedal force is shown in FIG. 5.

Accordingly, while only a few embodiments of the present invention have been shown and described, it is to be understood that many changes and modifications may be made thereunto without departing from the spirit and scope of the invention as defined in the appended claims.

What is claimed is:

1. A disengaging device for a clutch, the disengaging device disposed within a cylinder containing at least one piston connected to at least one clutch pedal rod, the disengaging device comprising:
    a) an energy store disposed within the cylinder that releases energy upon disengagement of the clutch and that stores energy upon re-engagement of the clutch; and
    b) a mechanism that contains a second piston disposed inside the cylinder adjacent to said energy store that is designed to increase an amount of energy in said energy store depending on a force arising in the disengaging device.

2. The disengaging device according to claim 1, wherein an increase in energy in the device is proportional to the force arising in the disengaging device.

3. The disengaging device according to claim 1, wherein the mechanism to increase energy comprises a hydraulic system with a check valve, and an energy receiving piston wherein the hydraulic system is disposed within said cylinder adjacent to said energy receiving piston.

4. The disengaging device according to claim 3, wherein the hydraulic system is driven by the hydraulics of the disengaging device.

5. The disengaging device according to claim 4, wherein the mechanism to increase energy comprises at least one compensation spring for absorbing energy produced within the disengaging device.

6. A disengaging device for a clutch, the disengaging device disposed within a cylinder containing at least one piston connected to at least one clutch pedal rod, the disengaging device comprising:
    a) an energy store disposed within the cylinder that releases energy upon disengagement of the clutch and that stores energy upon re-engagement of the clutch; and
    b) a force relay guided along a curved path, comprising a rolling bearing that rolls on the curved path, wherein the force relay contains mechanisms to divert a force between the energy store and the force relay.

7. A disengaging device for a clutch disposed within a cylinder containing at least one piston connected to at least one clutch pedal rod, the disengaging device comprising:
    a) an energy store disposed within the cylinder that releases energy upon disengagement the clutch and that stores energy upon re-engagement of the clutch; and
    b) a unit that is a component of the energy store that receives a force in a preferred direction and has a drive that moves essentially in one direction, wherein the unit and the drive are arranged so that both directions are essentially parallel.

8. The disengaging device according to claim 7, wherein the disengaging device further comprises a drive and an essentially linearly-driven disengaging piston.

9. The disengaging device according to claim 8, wherein the disengaging device is indirectly connected via a force-relaying element designed as a hydraulic connection to a disengaging unit.

10. A disengaging device for a clutch disposed within a cylinder containing at least one piston connected to at least one clutch pedal rod, the disengaging device comprising:
    a) an energy store disposed within the cylinder that releases energy upon disengagement of the clutch and that stores energy upon re-engagement of the clutch;
    b) at least one roller guided via a guide surface and a bevel that interacts with the energy store whereby the roller interacts with the contour of a disengaging drive.

11. The disengaging device according to claim 10, wherein the bevel and the contour run in an essentially opposite direction.

12. The disengaging device according to claim 11, wherein the roller has at least two units that are rotatably mounted in relation to each other, of which one contacts the bevel and the other contacts the contour.

13. The disengaging device according to claim 12, wherein the roller has at least one rotatably mounted guide body that interacts with the guide surface.

* * * * *